(12) United States Patent
Sakaguchi

(10) Patent No.: US 7,558,968 B2
(45) Date of Patent: Jul. 7, 2009

(54) INFORMATION PROCESSING APPARATUS AND METHOD

(75) Inventor: Hiroaki Sakaguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 911 days.

(21) Appl. No.: 10/743,088

(22) Filed: Dec. 23, 2003

(65) Prior Publication Data

US 2004/0139347 A1    Jul. 15, 2004

(30) Foreign Application Priority Data

Dec. 24, 2002  (JP)  ............................. 2002-372521

(51) Int. Cl.
| | |
|---|---|
| *G06F 11/30* | (2006.01) |
| *G06F 12/14* | (2006.01) |
| *H04L 9/32* | (2006.01) |
| *G06F 13/12* | (2006.01) |
| *G06F 13/38* | (2006.01) |
| *H04K 1/00* | (2006.01) |

(52) U.S. Cl. .......................... 713/189; 380/269; 710/68; 713/190

(58) Field of Classification Search ................. 380/269; 710/168; 713/189, 190
See application file for complete search history.

(56) References Cited

U.S. PATENT DOCUMENTS

| | | | | | |
|---|---|---|---|---|---|
| 5,410,671 | A | * | 4/1995 | Elgamal et al. ............. | 711/202 |
| 5,572,206 | A | * | 11/1996 | Miller et al. ................. | 341/51 |
| 5,943,421 | A | * | 8/1999 | Grabon ........................ | 380/269 |
| 6,275,588 | B1 | * | 8/2001 | Videcrantz et al. .......... | 380/255 |
| 6,442,680 | B1 | * | 8/2002 | Elnozahy ..................... | 712/227 |
| 6,691,305 | B1 | * | 2/2004 | Henkel et al. ................ | 717/136 |
| 6,732,256 | B2 | * | 5/2004 | Henkel et al. ................ | 712/208 |
| 6,779,101 | B1 | * | 8/2004 | Berg et al. .................... | 712/24 |
| 7,051,189 | B2 | * | 5/2006 | Warnes ........................ | 712/210 |
| 7,149,789 | B2 | * | 12/2006 | Slivka et al. ................. | 709/219 |
| 2001/0042112 | A1 | * | 11/2001 | Slivka et al. ................. | 709/220 |
| 2002/0033762 | A1 | * | 3/2002 | Belu ............................. | 341/87 |
| 2002/0059507 | A1 | * | 5/2002 | Hironaka ..................... | 711/170 |
| 2002/0143792 | A1 | * | 10/2002 | Belu ............................. | 707/200 |

OTHER PUBLICATIONS

Scott Bekker; Winzip 8.0 Now Shipping; May 9, 2000.*

* cited by examiner

*Primary Examiner*—Kambiz Zand
*Assistant Examiner*—James Turchen
(74) *Attorney, Agent, or Firm*—Oblon, Spivak, McClelland, Maier & Neustadt, P.C.

(57) ABSTRACT

A nonvolatile memory stores encrypted data, which is obtained by linking and encrypting program data, in which combined data is compressed, and first information data indicating the number of programs contained in the combined data, and second information data indicating the size of each program. A CPU reads the encrypted data from the nonvolatile memory and decrypts the read encrypted data to restore the program data, the first information data and the second information data, after which the program data is decompressed to restore the combined data that is then stored in RAM. The CPU also creates a program management table for managing the respective programs based on the first and second information data, and stores the program management table in the RAM. The present invention is applicable to microcomputers.

12 Claims, 8 Drawing Sheets

INFORMATION PROCESSING APPARATUS AND METHOD

CROSS REFERENCE TO RELATED APPLICATIONS

The present document claims priority to Japanese Priority Document JP 2002-372521, filed in the Japanese Patent Office on Dec. 24, 2002, the entire contents of which are incorporated herein by reference to the extent permitted by law.

BACKGROUND OF THE INVENTION

1. Field of the Invention

The present invention relates to an information processing apparatus and method, and particularly to an information processing apparatus and method that compress, for example, a plurality of programs and encrypt the compressed program data together with auxiliary data for each program.

2. Description of Related Art

Recently, LSIs (Large Scale Integrated circuits) in which a plurality of CPUs (Central Processing Units) is mounted are becoming more popular. Also, there is a growing number of LSIs which adopt a software solution oriented architecture and which are capable of handling different applications by switching software.

For products adopting such LSIs incorporating a plurality of CPUs and capable of handling different applications, a plurality of programs each including an instruction set of the same architecture are needed. Consequently, a larger-capacity storage is required as nonvolatile memory means, such as a flash memory, to store these programs, thus raising the manufacturing cost of the products.

In an attempt to overcome this problem, the size of a program is reduced, for example, by storing the program in ROM as compressed and also storing a map file for decompressing the compressed program in another ROM (see Japanese Patent Application Publication Hei-10-133880A).

In another attempt, the size of a program is reduced, for example, by leaving part of the program uncompressed and storing the rest as compressed in a ROM (see Japanese Patent Application Publication Hei-11-312089A).

In another attempt, the size of a program is reduced, for example, by compressing the program and storing information about the restoration method in the header of the compressed program (see Japanese Patent Application Publication Hei-5-313904A).

In another attempt, the memory occupied is reduced, for example, by storing a compressed program and a program for expanding the program integrally in ROM (see Japanese Patent Application Publication Hei-7-248921A).

Thus, the memory occupied can be reduced by compressing programs. However, in software solution oriented architectures, critical technology is often implemented by software, which is more susceptible to being copied by others than is hardware technology, and thus simply compressing programs would make reverse engineering by competitors easy.

In order to protect such critical technology, some program storing methods, which make reverse engineering difficult, have hence been proposed.

For example, there is a method in which a program is encrypted using a key. When a plurality of programs are involved, it is preferable that they be encrypted individually using a key (e.g., a pseudo random number seed or the like) specific to each program so as to make it hard to decipher.

However, for individual encryption, a large number of keys, the number of which is finite, are consumed, and an additional step of changing keys for each program is also an issue.

Another technique may be considered in which program data is compressed individually using a compression technique that gradually builds up a dictionary, such as LZ (Lempel Ziv) compression, adaptive arithmetic coding, or dynamic Huffman coding. However, these techniques require that the dictionary be re-built for each program, making the compression rate lower than compressing programs collectively.

Furthermore, for example, in programs each using the same instruction set, their statistical properties are similar, and particularly in programs sharing the same resources on the same system, their statistical properties are similar in terms of data such as address information and various device settings information. For such programs, it would be desirable to use this commonality in compressing them collectively to use the dictionary effectively. However, there exists no technique, to date, for compressing a plurality of programs collectively and further encrypting these compressed programs.

SUMMARY OF THE INVENTION

The present invention has been made in view of such circumstances and aims to compress a plurality of programs collectively and encrypt these compressed programs so that the memory occupied by the programs can be reduced and reverse engineering can also be prevented.

A first information processing apparatus of the present invention includes: compression means for combining and compressing a plurality of data; first generation means for generating first auxiliary data about the plurality of data; and encryption means for encrypting the data compressed by the compression means together with the first auxiliary data generated by the first generation means.

The plurality of data may be a plurality of programs.

The first auxiliary data may be data about the number of the plurality of data and the size thereof.

There may further be provided second generation means for generating second auxiliary data about the compressed data; and storage means for storing the encrypted data and the second auxiliary data generated by the second generation means.

The second auxiliary data may be data about the size of the compressed data.

A first information processing method of the present invention includes: a compression step of combining and compressing a plurality of data: a generation step of generating auxiliary data about the plurality of data; and an encryption step of encrypting the data compressed in the compression step together with the auxiliary data generated in the generation step.

In the first information processing apparatus and method of the present invention, the plurality of data are combined and then compressed. The auxiliary data about the plurality of data is generated. The compressed data is encrypted together with the auxiliary data.

The memory occupied by data can thus be reduced. Particularly, the memory occupied by a plurality of programs collectively compressed and encrypted can be reduced, and reverse engineering can also be prevented.

A second information processing apparatus includes: decryption means for decrypting encrypted data to restore compressed data, in which a plurality of data are combined and compressed, and auxiliary data about the plurality of data; and decompression means for decompressing the compressed data.

The plurality of data may be a plurality of programs.

The auxiliary data may be data about the number of the plurality of data and the size thereof.

There may further be provided creation means for creating a management table about locations of the plurality of data based on the auxiliary data; and memory means for storing the plurality of data and the management table created by the creation means.

A second information processing method includes: a decryption step of decrypting encrypted data to restore compressed data, in which a plurality of data are combined and compressed, and auxiliary data about the plurality of data; and a decompression step of decompressing the compressed data of the combined and compressed plurality of data.

In the second information processing apparatus and method, the encrypted data is decrypted to restore the compressed data, in which the plurality of data are combined and compressed, and the auxiliary data about the plurality of data. The compressed data of the combined and compressed plurality of data is then decompressed.

Data processing can thus be made faster and simpler. Particularly, decryption/decompression processing for a plurality of programs that are compressed and encrypted together can be made faster and simpler.

A third information processing apparatus of the present invention includes: compression means for combining and compressing a plurality of data; first generation means for generating first auxiliary data about the plurality of data; encryption means for encrypting the data compressed by the compression means together with the first auxiliary data generated by the first generation means; second generation means for generating second auxiliary data about the compressed data; storage means for storing the encrypted data and the second auxiliary data; decryption means for decrypting the encrypted data stored in the storage means to restore the compressed data and the first auxiliary data; decompression means for decompressing the compressed data; selection means for selecting predetermined data from the plurality of data decompressed by the decompression means; and execution means for executing the predetermined data selected by the selection means.

There may further be provided creation means for creating a management table about the locations of the plurality of data based on the second auxiliary data; and memory means for storing the plurality of data decompressed by the decompression means and the management table created by the creation means.

The execution means may be designed so as to execute processing of the predetermined data based on the management table stored in the memory means.

There may further be provided communication means for instructing the start of a decryption process by the decryption means and of a decompression process by the decompression means, and for notifying the termination of the decryption and decompression processes.

The plurality of data may be a plurality of programs.

The first auxiliary data may be data about the number of the plurality of data and the size thereof, and the second auxiliary data may be data about the size of the compressed data.

A third information processing method of the present invention includes: a compression step of combining and compressing a plurality of data; a first generation step of generating first auxiliary data about the plurality of data; an encryption step of encrypting the data compressed in the compression step together with the first auxiliary data generated in the first generation step; a second generation step of generating second auxiliary data about the compressed data; a storage step of storing the encrypted data and the second auxiliary data; a decryption step of decrypting the encrypted data stored in the storage step to restore the compressed data and the first auxiliary data; a decompression step of decompressing the compressed data; a selection step of selecting predetermined data from the plurality of data decompressed in the decompression step; and an execution step of executing processing of the predetermined data selected in the selection step.

In the third information processing apparatus and method of the present invention, the plurality of data are combined and then compressed. The first auxiliary data about the plurality of data is generated and encrypted together with the compressed data. The second auxiliary data about the compressed data is generated and stored together with the encrypted data. Furthermore, the encrypted data is decrypted to restore the compressed data and the first auxiliary data. The compressed data is decompressed. Predetermined data is selected from the decompressed plurality of data and is then executed.

Therefore, the memory occupied by data can be reduced and data processing can be made faster and simpler. Particularly, the memory occupied by a plurality of programs collectively compressed and encrypted can be reduced, and their decryption/decompression processing can also be made faster and simpler.

DESCRIPTION OF THE PREFERRED EMBODIMENTS

Embodiments of the present invention will now be described with reference to the drawings.

Figure 1:
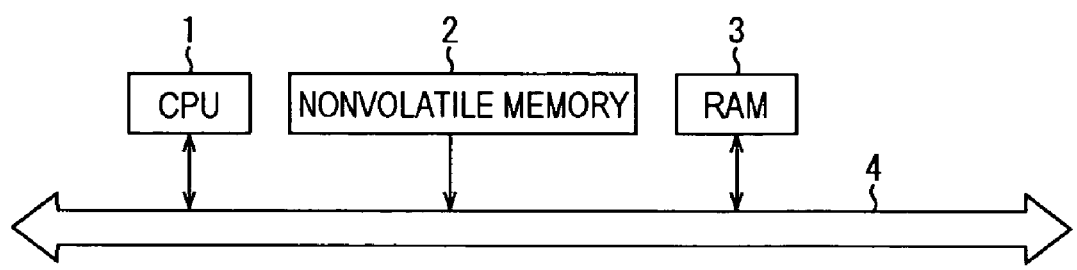
FIG. 1 shows an example configuration of a microcomputer to which the present invention is applied.

FIG. 1 shows an example configuration of a microcomputer to which the present invention is applied. A CPU 1 performs various processes according to programs loaded from a nonvolatile memory 2 to RAM 3.

The nonvolatile memory 2 is comprised of, for example, EEPROM (Electrically Erasable and Programmable Read Only Memory), a flash memory and the like, and stores compressed and encrypted programs and the like necessary in order for the CPU 1 to perform the various processes.

The RAM 3 is comprised of readable and writable memory, such as DRAM (Dynamic Random Access Memory), SRAM (Static RAM) and the like, and stores programs read from the nonvolatile memory 2 and also a program management table 51 (FIG. 3) that manages the head addresses of the programs, and the like.

The CPU 1, the nonvolatile memory 2, and the RAM 3 are interconnected via a bus 4.

Figure 2:
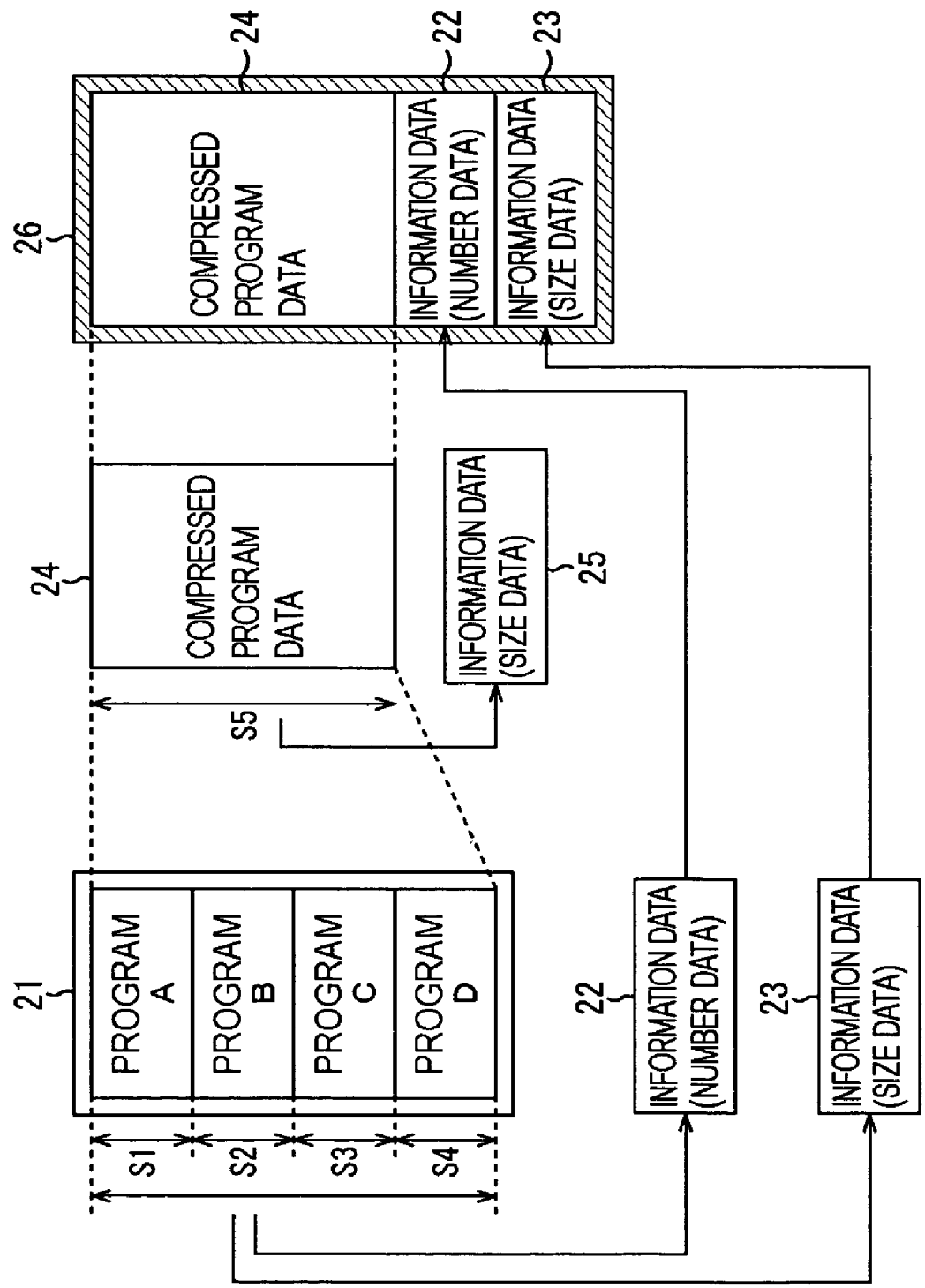
FIG. 2 shows an example structure of data stored in a ROM.

FIG. 2 shows an example structure of data stored in the nonvolatile memory 2. As shown in the figure, programs A to D combined in a pre-defined order are taken to be data 21, which is stored in the nonvolatile memory 2.

The CPU 1 generates information data 22 indicating the number of programs contained in the data 21 (four in the example of FIG. 2), and also generates information data 23 indicating the size of each program contained in the data 21 (S1 to S4 in the example of FIG. 2).

By way of this information data 23, even if the data 21 in which the plurality of programs A to D are combined is loaded from the nonvolatile memory 2 to the RAM 3, the CPU 1 is able to calculate the relative addresses thereof within the data 21, and is thus able to easily find out the beginning address of each program.

The CPU 1 compresses the data 21, in which the programs A to D are combined; using a conventional compression algorithm such as LZ77 to generate program data 24, while at the same time generating information data 25 indicating the size of the compressed program data 24 (S5 in the example of FIG. 2).

In addition, the CPU 1 links the compressed program data 24, the information data (number data) 22, and the information data (size data) 23 into one block of data and encrypts the linked data using a conventional cryptographic technique, such as a one-time pad using pseudo random numbers and a one-way function, to generate data 26. Here, the program data 24 and the data 26 are encrypted such that they are substantially equal in size. The encrypted data 26 and the information data 25 indicating the size of the compressed program data 24 are stored in the nonvolatile memory 2.

Figure 3:
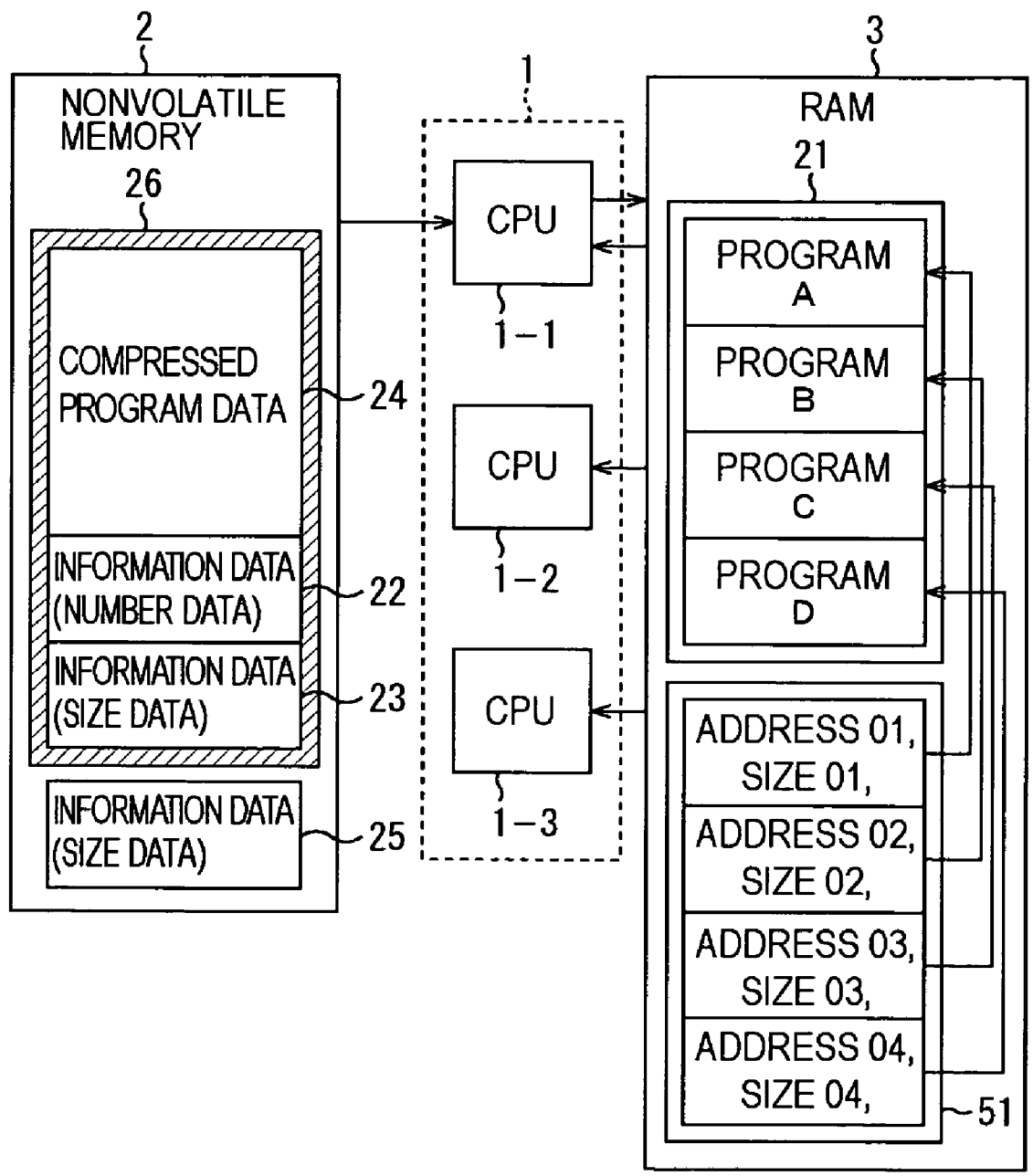
FIG. 3 schematically shows a process in which encrypted data is decompressed and executed.

FIG. 3 schematically shows a process in which the CPU 1 decompresses the encrypted data 26 stored in the nonvolatile memory 2, stores the decompressed data in the RAM 3 as programs, and executes these programs.

Note that in order to illustrate the correspondence between a single CPU 1 and a plurality of programs, the CPU 1 will be, for purposes of convenience, shown in the drawings as CPUs 1-1 to 1-3, and the CPU 1-1 will execute the program A; the CPU 1-2 will execute the program B; and the CPU 1-3 will execute the program C or D.

As mentioned above with reference to FIG. 2, the nonvolatile memory 2 stores the encrypted data 26 and the information data 25 indicating the size of the compressed program data 24.

For example, the CPU 1-1 reads the data 26 and the information data 25 from the nonvolatile memory 2, decrypts the encrypted data 26 to restore the program data 24, the information data 22, and the information data 23. The CPU 1-1 then decompresses the compressed program data 24 to restore the data 21 and saves it in the RAM 3. At this point, the CPU 1-1 judges that processing has been completed when all the data with the size indicated by the information data 25 has been decrypted and decompressed.

In the decryption and decompression processes, when one-time pad cryptography and a method in which sequential processing is possible, such as LZ77, are used in combination, the CPU 1-1 can directly convert the data 26 into the data 21 by performing decryption and decompression simultaneously without requiring any work memory for saving the compressed program data 24.

Since the CPU 1-1 can also find out the number of programs contained in the data 21 and their respective size based on the restored information data 22 and 23, it calculates the head address of each program from such information, creates a program management table 51 about the correspondence between each program and its head address and size, and stores the program management table 51 in the RAM 3.

In the program management table 51 shown in FIG. 3, the program A is associated with an address 01 and a size 01, the program B with an address 02 and a size 02, the program C with an address 03 and a size 03, and the program D with an address 04 and a size 04.

In this way, the programs A to D contained in the data 21 are managed by the program management table 51 in the RAM 3.

For example, a predetermined CPU 1, or a CPU 1 specified by an external apparatus that is not shown in the figure (the CPU 1-1 in the example of FIG. 3) makes executable a pre-defined program, or a program specified by the external apparatus, based on the restored data 21 and the program management table 51 in the RAM 3, and executes it.

More specifically, the CPU 1-1 reads the head address (the address 01 in the current case) associated with the program to be executed (the program A in the current case) from the program management table 51 managed in the RAM 3, and calculates a beginning address of the program from the head address that is read. The beginning address can be calculated easily as long as a relative address from the head address is pre-defined. And the CPU 1-1 jumps to the calculated beginning address within the RAM 3 to start execution of the program A.

Furthermore, the CPU 1-2 reads the head address (the address 02 in the current case) associated with the program to be executed (the program B in the current case) from the table 51 managed in the RAM 3, calculates a beginning address of the program from the head address that is read, and jumps to the calculated beginning address within the RAM 3 to start execution of the program B.

Similarly, the CPU 1-3 reads the head address (the address 03 or 04 in the current case) associated with the program to be executed (the program C or D in the current case) from the table 51 managed in the RAM 3, calculates a beginning address of the program from the head address that is read, and jumps to the calculated beginning address within the RAM 3 to start execution of the program C or D.

Figure 4:
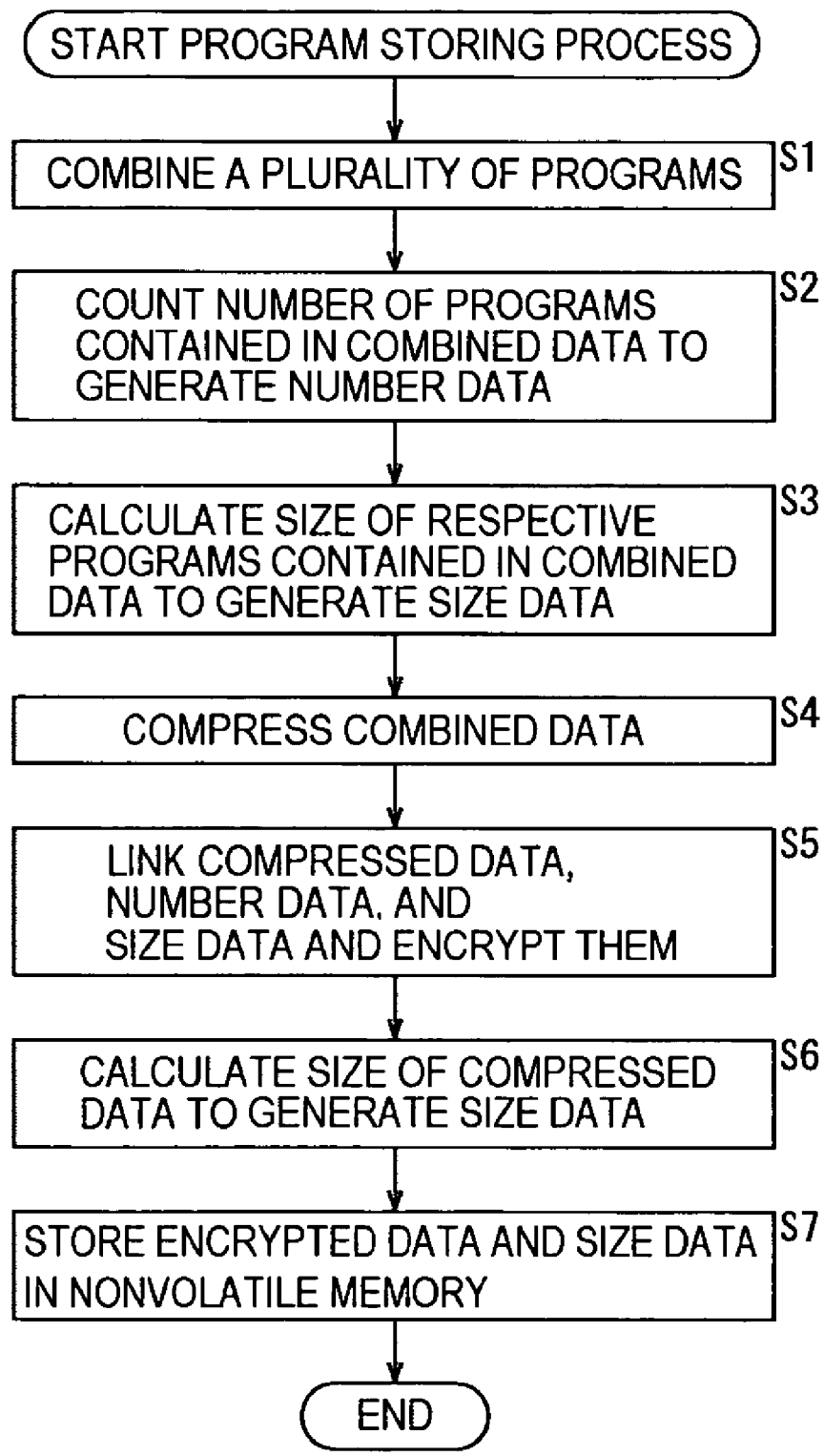
FIG. 4 is a flowchart illustrating a process of storing a plurality of programs.

Referring next to the flowchart of FIG. 4, a process of storing a plurality of programs executed by the CPU 1-1 will be described.

In step S1, the CPU 1-1 combines a plurality of programs in a pre-defined order or in an order instructed by an external apparatus (not shown in the drawings). As a result, the data 21 in which the programs A to D are combined is generated as shown in FIG. 2.

In step S2, the CPU 1-1 counts the number of programs contained in the data 21 that was combined in step S1 to generate the information data 22 as data indicating the number of programs (four in the example of FIG. 2). In step S3, the CPU 1-1 calculates the size of each of the programs contained in the combined data 21, to generate the information data 23 as data indicating the size of each (S1 to S4 in the example of FIG. 2).

In step S4, the CPU 1-1 compresses the data 21 combined in step S1 using a conventional compression technique such as LZ77 to generate the program data 24. In step S5, the CPU 1-1 links the program data 24 compressed in step S4, the information data (number data) 22 generated in step S2, and the information data (size data) 23 generated in step S3 together, and encrypts the linked data using a conventional cryptographic technique, such as a one-time pad that uses pseudo random numbers and one-way functions, to generate the data 26.

In step S6, the CPU 1-1 calculates the size of the data 24 compressed in step S4 to generate the information data 25 as data indicating the size of the data 24 (S5 in the example of FIG. 2). In step S7, the CPU 1-1 stores the data 26 encrypted in step S5 and the information data (size data) 25 generated in step S6 in the nonvolatile memory 2.

By thus compressing the plurality of programs collectively in this way, less overhead operation is involved as compared to compressing them individually, management data can be reduced, and the decompression program and apparatus simplified.

In addition, due to their similar statistic properties, programs using the same instruction set could provide a better compression rate when compressed collectively rather than individually. Furthermore, by encrypting the information about the number of programs (information data 22) and the information about the location and size of each program (information data 23) together with the compressed data (program data 24) in which the plurality of programs are combined, it can be made difficult to infer the program information from the encrypted data (data 26), thereby making it harder to decipher.

Figure 5:
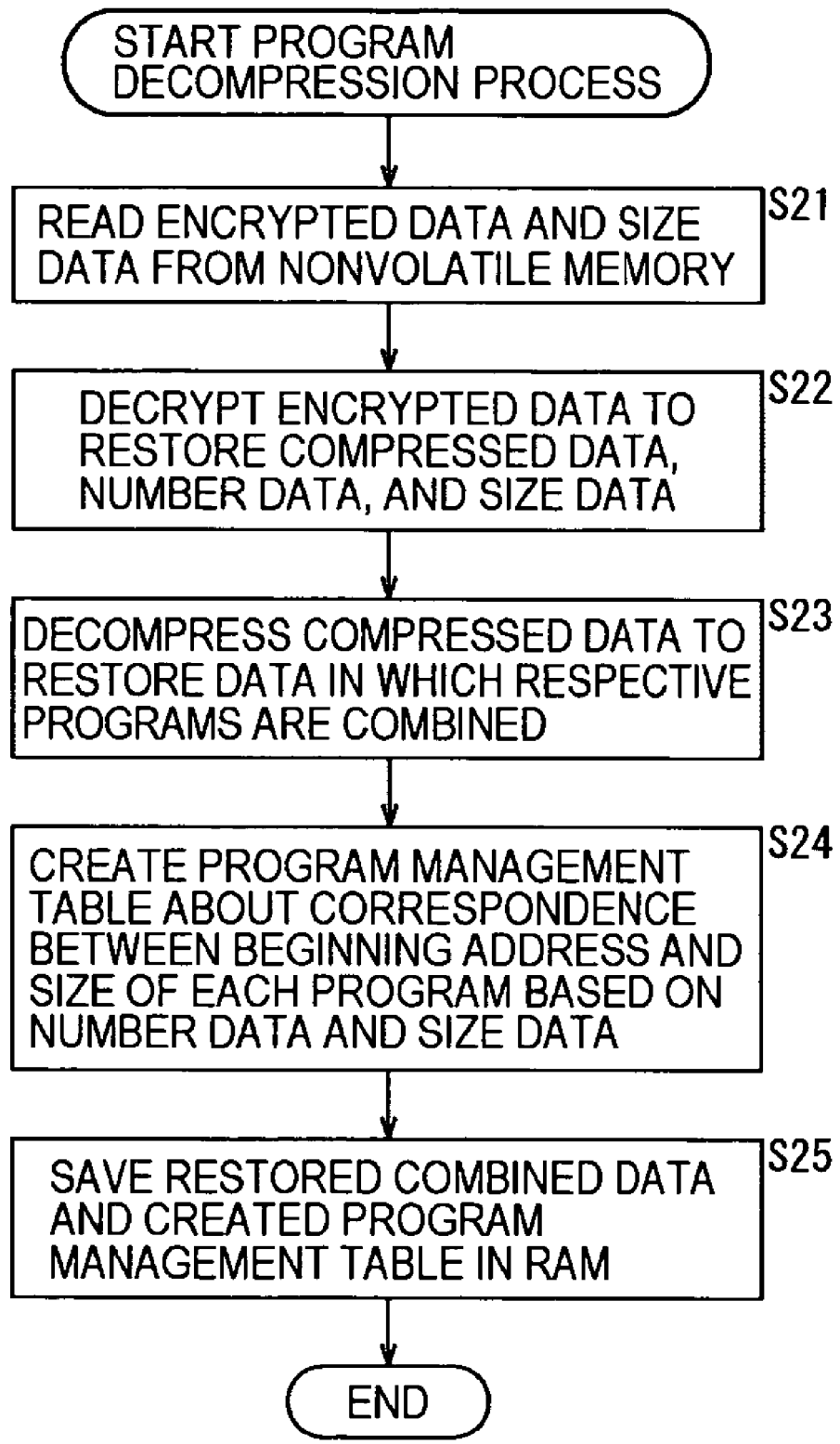
FIG. 5 is a flowchart illustrating a process of decompressing a plurality of programs.

Referring next to the flowchart of FIG. 5, a process, which is performed by the CPU 1-1, of decompressing the plurality of programs stored in the nonvolatile memory 2 will be described.

In step S21, the CPU 1-1 reads the encrypted data 26 and the information data (size data) 25 from the nonvolatile memory 2. In step S22, the CPU 1-1 decrypts the encrypted data 26, which was read in step S21, using a one-time pad or the like to restore the compressed program data 24, the information data (number data) 22, and the information data (size data) 23.

In step S23, the CPU 1-1 decompresses the compressed program data 24 restored in step S22 using LZ77 or the like to restore the data 21 in which the programs A to D are combined. In step S24, the CPU 1-1 calculates the head address of each program contained in the data 21 decompressed in step S23 based on the information data (number data) 22 and the information data (size data) 23 restored in step S22, and creates the program management table 51 about the correspondence between each program and its head address and size.

In step S25, the CPU 1-1 stores in the RAM 3 the data 21, which is restored in step S23 and in which the programs A to D are combined, and the program management table 51 created in step S24.

Thus, since the decryption and decompression steps for all the programs can be performed successively, processing can be made faster and simpler. In terms of software, this would further lead to a reduction in the size of the decoder program, and, in terms of hardware, to a smaller number of gates.

In addition, since, as a result of the above-mentioned program decompression step, the data 21 in which the plurality of programs A to D are combined and the program management table 51 for managing these programs are saved in the RAM 3, the CPU 1 can jump quickly to the address of a program to be executed and start executing that program.

Figure 6:
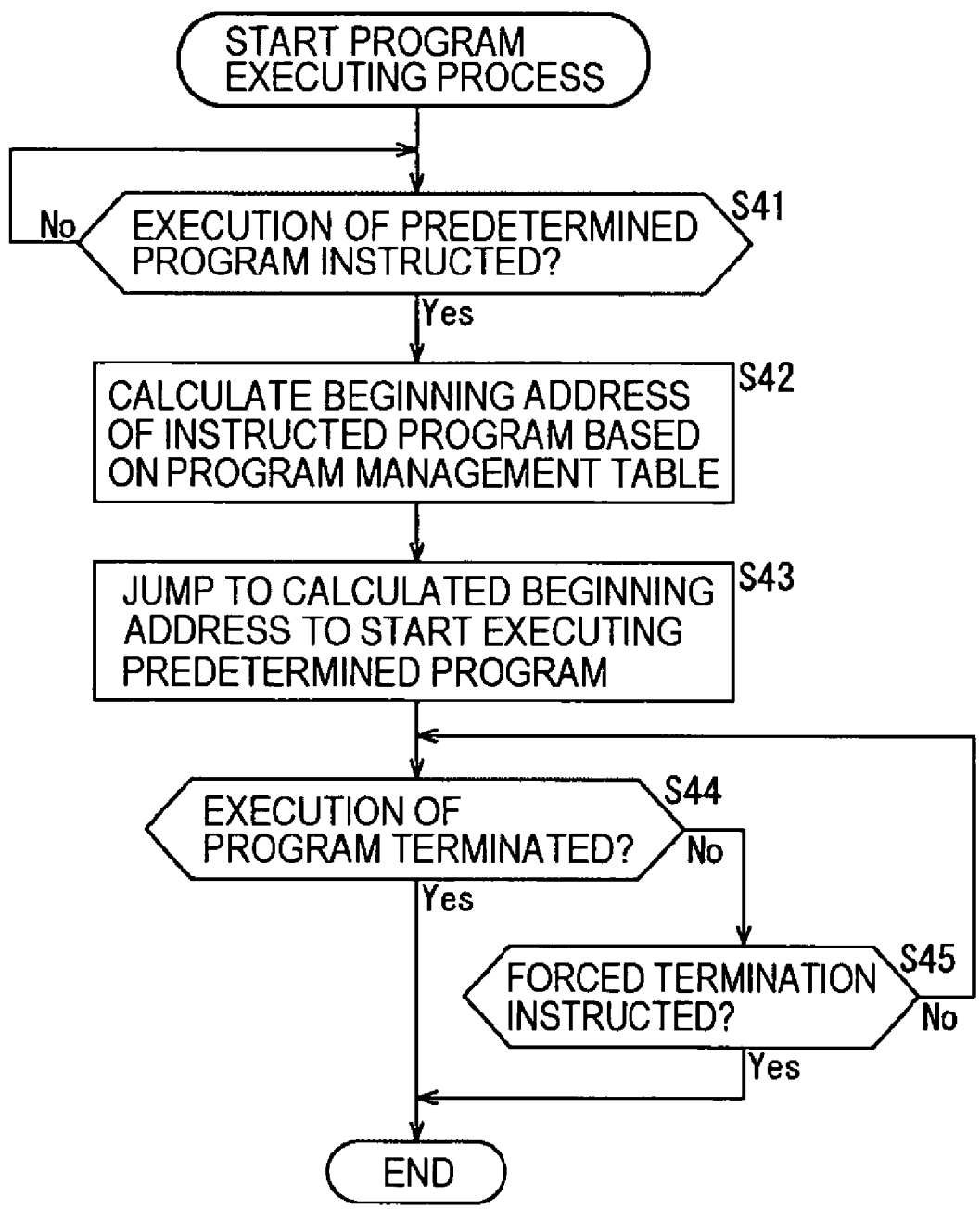
FIG. 6 is a flowchart illustrating a process of executing a program.

Referring next to the flowchart of FIG. 6, a process, executed by the CPU 1-1, of executing a program saved in the RAM 3 will be described.

In step S41, the CPU 1-1 determines whether or not execution of a predetermined program (e.g., the program A) is instructed, and waits until execution of a predetermined program is instructed. Then, if it is determined in step S41 that execution of a predetermined program is instructed, the process proceeds to step S42, and the CPU 1-1 reads the head address (the address 01 in the current case) associated with that program (the program A in the current case), whose execution is instructed, based on the program management table 51 saved in the RAM 3, and calculates a beginning address of the program from the head address that is read.

In step S43, the CPU 1-1 jumps to the beginning address in the RAM 3, which is calculated in step S42, to start executing the predetermined program (the program A in the current case). In step S44, the CPU 1-1 determines whether or not the execution of that program has terminated, and the process proceeds to step S45 if it is determined that the program is still under execution.

In step S45, the CPU 1-1 further determines whether or not forced termination of the program under execution is instructed by an external apparatus (not shown in the drawings). Unless forced termination is instructed, the process returns to step S44 to repeat this process. If it is determined in step S44 that execution of the program has terminated or in step S45 that forced termination of the program under execution is instructed, then the process terminates.

Thus, even if a plurality of programs are combined and saved in the RAM 3, the CPU 1 is able to jump quickly to the beginning address of the program to be executed based on the program management table 51 and execute that program.

Note that although the above-mentioned processes of FIGS. 4 to 6 have been described with reference to the CPU 1-1, they can, of course, be performed by the CPU 1-2 or 1-3 as well.

Figure 7:
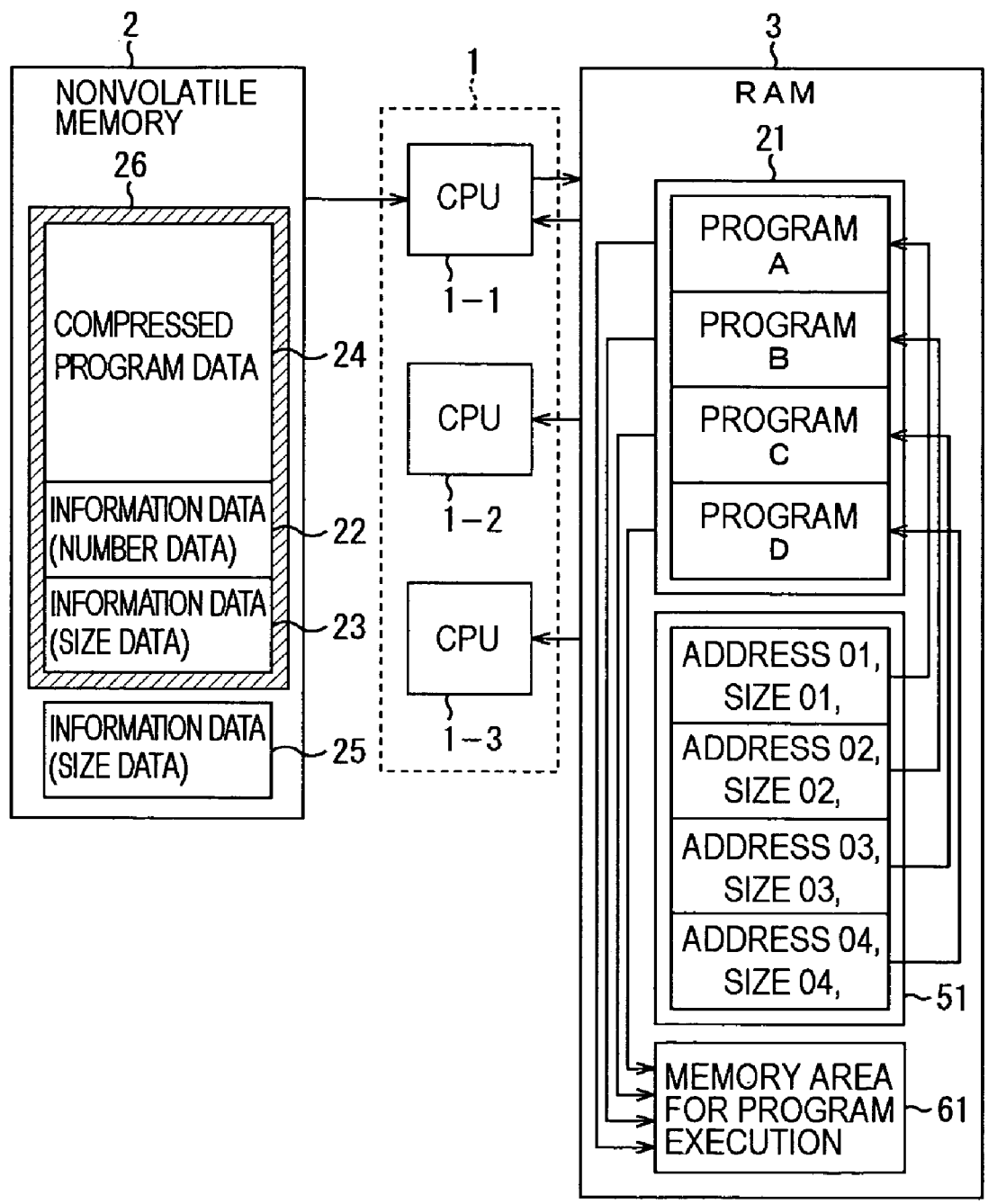
FIG. 7 schematically shows another process in which encrypted data is decompressed and executed.

In the description above, the head address associated with a program to be executed is read from the program management table 51, a beginning address of the program is calculated from the head address that is read, and execution of that program is started by jumping to the calculated beginning address. However, as shown in FIG. 7, for example, the CPU 1 may identify the location where a program to be executed is stored from the corresponding head address of the program in the program management table 51, and transfer that program to a predetermined memory area 61 where that program is executable. Then any of the CPUs 1-1 to 1-3 responsible for execution may jump to a predetermined address within the memory area 61 to start executing that program. In this case, it is assumed that the memory area 61 and the beginning address are pre-defined.

Thus, by using SRAM, DRAM or the like mounted together with the CPU within the LSI as the predetermined memory area 61, high-speed program execution can be achieved.

Figure 8:
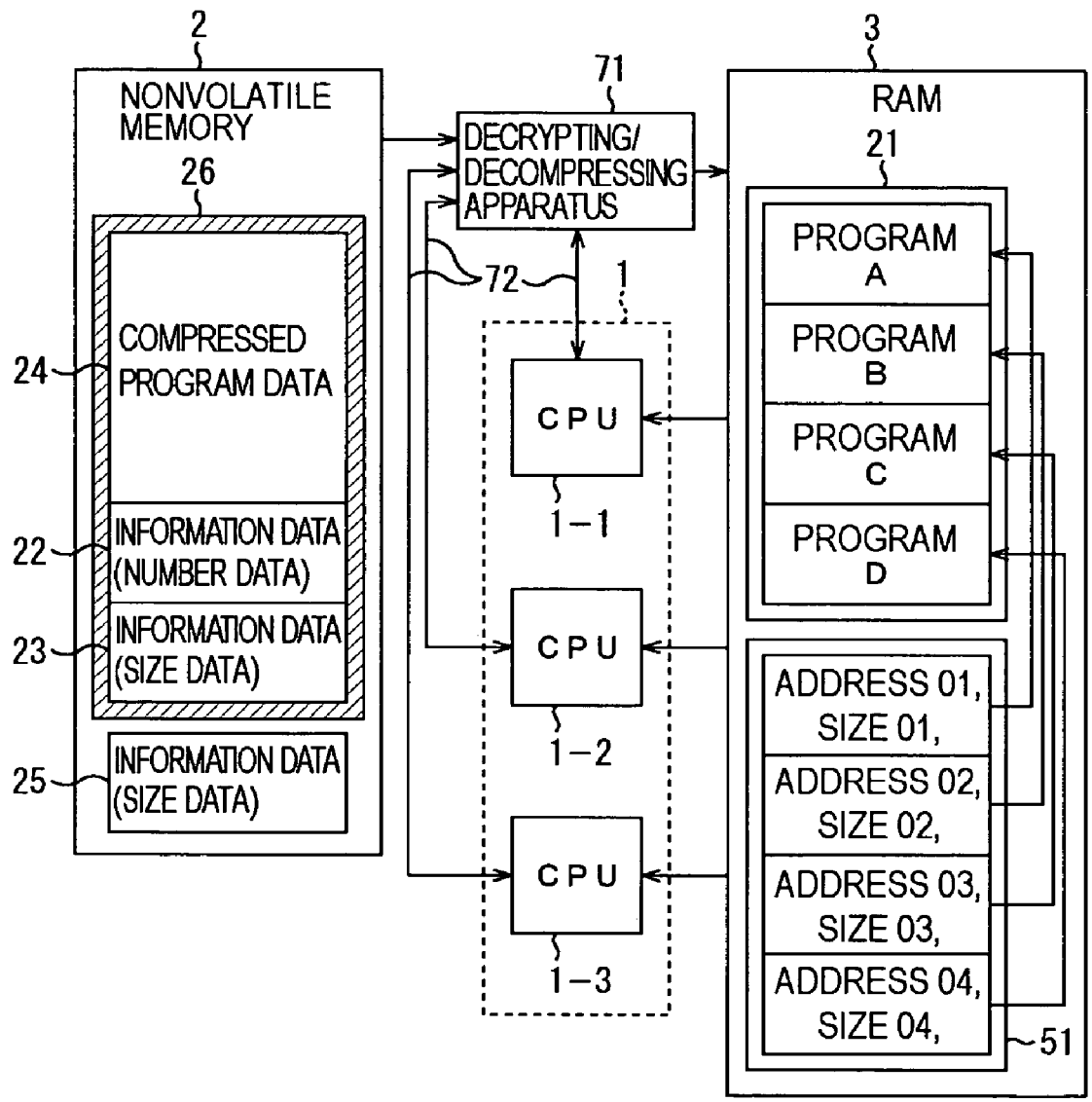
FIG. 8 schematically shows another process in which encrypted data is decompressed and executed.

In addition, in the description above, the CPU 1-1 performs the decryption of the encrypted data 26, the decompression of the compressed program data 24, and the creating of the program management table 51. However, as shown in FIG. 8, for example, a decrypting/decompressing apparatus 71 may additionally be provided to perform these steps.

In this case, these steps are initiated when an external apparatus (not shown) or the CPUs 1-1 to 1-3 instruct the decrypting/decompressing apparatus 71, via communication means 72, to perform decryption and decompression. Here, the communication means 72 may include a dedicated signal, a register on the bus, or the like.

The decrypting/decompressing apparatus 71 having been thus instructed performs decryption and decompression as mentioned above with reference to FIG. 5. In other words, the decrypting/decompressing apparatus 71 reads the encrypted data 26 and the information data 25 from the nonvolatile memory 2 (step S21), decrypts the encrypted data 26 to restore the compressed program data 24, the number information data 22, and the size information data 23 (step S22), decompresses the compressed program data 24 to restore the data 21 in which the programs A to D are combined together (step S23), creates the program management table 51 based on the information data 22 and 23 (step S24), and saves the data 21 and the program management table 51 in the RAM 3 (step S25).

The decrypting/decompressing apparatus 71 notifies the CPU 1 of the completion of these processes via the communication means 72. Thus, the CPU 1 is able to know what processes have been performed by the decrypting/decompressing apparatus 71 through the communication means 72. Also, by utilizing the communication means 72, the implementation of events such as canceling the resetting of the CPU 1, issuing an interrupt to the CPU 1 by the decrypting/decompressing apparatus 71, or the CPU 1 polling the status register of the decrypting/decompressing apparatus 71 can be made possible.

Thus, the CPUs 1-1 to 1-3 can execute a predetermined program using the data 21 restored in the RAM 3 and the program management table 51 by way of an instruction from an external apparatus (not shown) or in a pre-defined manner. The term "in a pre-defined manner" will herein include a case where a program executed first contains information about which program is to be executed next and how it is to be executed.

In the description above, SRAM, DRAM or the like mounted together with the CPU 1 within the LSI is used. While the SRAM within the LSI does permit high-speed access by the CPU 1, it would be difficult to mount a large-capacity SRAM within the LSI. To overcome this inconvenience, a feasible system would be one in which, for example, the data 21 is stored in large-capacity DRAM external to the LSI, which therefore does not allow as high-speed an access as is possible within the LSI, and when the CPU 1 is to execute a specific program, that program is copied from the external DRAM to the SRAM within the LSI before starting its execution.

In such a system, the internal SRAM may be allocated as a predetermined memory area, and a plurality of programs may be interchanged depending on the circumstances, thereby allowing more functions to be performed using the SRAM within the LSI at a higher speed.

As mentioned above, it is highly probable that the data 21 contains a greater number of programs than there are CPUs, and hence the number of programs cannot be surmised from the number of CPUs within the LSI. Therefore, the data 26 in which the plurality of programs is collectively compressed and further encrypted has its encryption and compression rate concealed, thereby providing more secure protection against reverse engineering.

The series of processing mentioned above can be performed by hardware and also by software.

It is to be noted that in the present specification the steps describing a program to be recorded in a recording medium include not only processing performed chronologically in the order described above, but also processing performed in parallel or individually.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. An information processing apparatus, comprising:
    a memory configured to store a plurality of individual programs that each include a same instruction set;
    compression means for combining and compressing the plurality of individual programs to output compressed program data;
    first generation means for generating and outputting first auxiliary data including a total number of individual programs combined and compressed by the compression means and a size of each individual program combined and compressed by the compression means;
    encryption means operatively connected with the compression means and the first generation means for encrypting said compressed program data received from said compression means together with said first auxiliary data received from said first generation means to output encrypted data.

2. The information processing apparatus according to claim 1, further comprising:
    second generation means for generating second auxiliary data indicating a size of said compressed program data; and
    storage means operatively connected with the encryption means and the second generation means for storing said encrypted data received from the encryption means and said second auxiliary data received from said second generation means.

3. An information processing method comprising:
    storing. at a memory, a plurality of individual programs that each include a same instruction set;
    combining and compressing the plurality of individual programs to form compressed program data:
    generating first auxiliary data including a total number of individual programs that have been combined and compressed and a size of each individual combined and compressed program;
    encrypting said compressed data together with said first auxiliary data to form encrypted data.

4. An information processing apparatus, comprising:
    decryption means for decrypting encrypted data including a plurality of encrypted combined and compressed individual programs that each include a same instruction set and encrypted first auxiliary data indicating a total number of the individual programs that were combined and compressed and a size of each of the combined and compressed individual programs to output decrypted compressed program data and decrypted auxiliary data indicating the total number of combined and compressed individual programs and the size of each of the combined and compressed individual programs;
    decompression means operatively connected to the decryption means for receiving the decrypted compressed program data and for decompressing said decrypted compressed program data to output decompressed and combined individual programs;
    creation means operatively connected to the decryption means for receiving the decrypted first auxiliary data and for creating a management table about locations of individual ones of said plurality of individual programs based on said decrypted first auxiliary data; and
    a memory configured to receive the decompressed and combined individual programs from the decompression means and to receive the management table from the creation means, said memory further configured to store the decompressed and combined individual programs and said management table.

5. An information processing method, comprising:

decrypting encrypted data including a plurality of encrypted combined and compressed individual programs that each include a same instruction set and encrypted first auxiliary data indicating a total number of combined and compressed individual programs and a size of each of the combined and compressed individual programs to output decrypted compressed program data including the plurality of combined and compressed individual programs and decrypted first auxiliary data indicating the total number of combined and compressed individual programs and the size of each of the combined and compressed individual programs;

decompressing said decrypted compressed program data to output decompressed and combined individual programs;

creating a management table about locations of individual ones of said plurality of individual programs based on said decrypted first auxiliary data; and storing, at a memory, the decompressed and combined individual programs and said management table.

6. An information processing apparatus, comprising:

compression means for combining and compressing a plurality of individual programs that each include a same instruction set to output compressed program data;

first generation means for generating and outputting first auxiliary data including a total number of individual programs combined and compressed by the compression means and a size of each individual program combined and compressed by the compression means;

encryption means operatively connected to the compressing means and the first generation means for encrypting said compressed program data received from said compression means together with said first auxiliary data received from said first generation means to form encrypted data;

second generation means for generating second auxiliary data indicating a size of said compressed program data;

a memory, connected to the encryption means and the second generation means, configured to store the encrypted data received from said encryption means and said second auxiliary data received from said second generation means;

decryption means operatively connected with the storage means for decrypting said encrypted data stored in said storage means to restore said compressed program data and said first auxiliary data;

decompression means operatively connected with the decryption means for decompressing said restored compressed program data received from said decryption means and outputting said decompressed program data as said plurality of combined individual programs;

selection means operatively connected with the decompression means for selecting a predetermined one of the plurality of combined individual programs from said plurality of combined individual programs received as said decompressed program data from said decompression means; and execution means for receiving and executing said predetermined one of the plurality of combined individual programs.

7. The information processing apparatus according to claim 6, further comprising:

creation means for creating a management table about locations of said plurality of combined individual programs based on said second auxiliary data; and memory means operatively connected to the decompression means and the creation means for storing said plurality of combined individual programs received from said decompression means and said management table received from said creation means.

8. The information processing apparatus according to claim 7, wherein said execution means executes processing of said predetermined one of the plurality of combined individual programs based on said management table stored in said memory means.

9. The information processing apparatus according to claim 6, further comprising communication means operatively connected to the decryption means and the decompression means for instructing the initiation of a decryption process by said decryption means and a decompression process by said decompression means, and for notifying the termination of said decryption and decompression processes.

10. An information processing method comprising:

combining and compressing a plurality of individual programs that each contain a same instruction set to output compressed program data;

generating first auxiliary data including a total number of individual programs that have been combined and compressed and a size of each combined and compressed individual program;

encrypting said compressed program data together with said first auxiliary data to form encrypted data;

generating second auxiliary data indicating a size of said compressed program data;

storing, at a memory, said encrypted data and said second auxiliary data;

accessing said encrypted data from said data store and decrypting said accessed encrypted data to restore said compressed program data and said first auxiliary data;

decompressing said restored compressed program data and outputting decompressed program data as said plurality of combined individual programs;

selecting a predetermined one of the plurality of combined individual programs from said plurality of combined individual programs forming said decompressed program data; and executing said predetermined one of the plurality of combined individual programs.

11. The information processing method according to claim 3, further comprising:

generating second auxiliary data indicating a size of said compressed program data; and storing said encrypted data and said second auxiliary data.

12. The information processing apparatus according to claim 10, further comprising:

creating a management table about locations of said plurality of combined individual programs based on said second auxiliary data; and storing said plurality of said combined individual programs and said management table in a data store.

* * * * *